Jan. 15, 1974   D. M. BOYD ET AL   3,785,963

UNIFORM SOLIDS WITHDRAWAL SYSTEM

Filed Nov. 18, 1971   2 Sheets-Sheet 1

United States Patent Office 3,785,963
Patented Jan. 15, 1974

3,785,963
UNIFORM SOLIDS WITHDRAWAL SYSTEM
David M. Boyd, Clarendon Hills, and Arthur R. Greenwood, Niles, Ill., assignors to Universal Oil Products Company, Des Plaines, Ill.
Filed Nov. 18, 1971, Ser. No. 200,123
Int. Cl. C10g 35/10
U.S. Cl. 208—171                    2 Claims

ABSTRACT OF THE DISCLOSURE

Uniform amounts of solids are withdrawn from a movable bed of solids by a system comprising a plurality of conduits equally spaced across the solids cross-sectional area and communicating with a collector vessel partitioned into a plurality of vertical sections of equal volume.

BACKGROUND OF THE INVENTION

The present invention relates to a system for withdrawing a uniform amount of solids from a plurality of conduits communicating with a movable bed of solids. More particularly, the present invention relates to a system for withdrawing a uniform amount of catalyst from a plurality of points on a movable catalyst bed.

Systems containing a movable bed of solids such as moving bed reactors, filtration units and heat exchangers, are known to the art. In these systems, portions of the bed are periodically or continuously withdrawn with the desire that all of the solids contained within the system are removed or move at a uniform rate. For example, in a continuous reforming process as exemplified by Carson, U.S. Pat. No. 3,470,090, spent catalyst is periodically withdrawn and fresh or reconditioned catalyst is periodically added. In such an environment wherein a hydrocarbon conversion reaction is effected, it is imperative that all of the catalysts maintain relatively the same residence time within the moving bed system. If there is a broad variance in residence time between different, discrete portions of catalyst, there will be a propensity for the catalyst remaining in the reactor system longer than desired to agglomerate due to the formation of hydrocarbonaceous deposits between the non-moving or slow moving particles, thereby causing further maldistribution in catalyst flow. Further, since the withdrawn catalyst is usually regenerated, it is preferred that the catalyst be free of hydrocarbons.

A step toward uniform flow of solids or catalyst through a system can be taken by withdrawing the solids from a plurality of points equally spaced across the solids cross-sectional area, rather than withdraw the solids from a single, centrally located point. However, while this mode of operation gives improved results, uniform withdrawal rates from each of the plurality of points are not usually attained and an undesirable variance in residence time persists.

SUMMARY OF THE INVENTION

Accordingly, it is an object of the present invention to provide a system for withdrawing an equal amount of solids from each of a plurality of equally spaced points on the cross-sectional area of a movable solids bed.

More particularly, it is an object of the present invention to provide a system for withdrawing an equal amount of catalyst from each of a plurality of equally spaced points on the cross-sectional area of a movable catalyst bed wherein the catalyst bed is maintained under hydrocarbon conversion conditions and the catalyst, as ultimately removed, is to be relatively free of hydrocarbons.

In an embodiment, therefore, the present invention relates to an improvement in a system containing a movable bed of solid particles wherein the solid particles are to be withdrawn in relatively equal amounts from selected points in the cross-sectional area of the movable bed. The particular improved system comprises a chamber, adapted to contain a movable bed of solids, having a plurality of openings for solids removal located below the solids bed and distributed equally across the cross-sectional area of a solids bed. The present invention is particularly applicable when the chamber is a catalytic reactor containing a hydrocarbon conversion catalyst at hydrocarbon conversion conditions. Also included within the improved system is a solids collector vessel partitioned into a plurality of vertical sections of relatively equal volume by a plurality of vertical baffles. The number of sections in the solids collector vessel is equal in number to the openings in the chamber containing the movable bed of solids. Connecting each opening in the chamber with each vertical section in the solids collector, is a plurality of conduit means which terminate a short distance below the top of the vertical baffles whereby the amount of solids withdrawn from each part of the bed to each conduit is substantially equal to the volume of each vertical section in the solids collector.

This improved system is particularly applicable when the hydrocarbon conversion catalyst is a reforming catalyst disposed within the reactor chamber as a movable annular bed. Preferably, the chamber containing the movable bed of solids is superjacent to the solids collector, whereby the flow of solids from the chamber to the plurality of conduits is by gravity flow.

In a more limited embodiment, the solids collector vessel has an upper cylindrical portion and a lower conical portion. Located in the bottom, apex portion of the conical portion of the solids collector vessel is a common, non-baffled collecting section in communication with each of the vertical sections. To insure a more uniform solids withdrawal, a conical baffle means is spaced above each solids removal opening in the chamber containing the movable bed of solids.

In an alternative embodiment, the present invention relates to a method for withdrawing catalyst from a hydrocarbon reaction chamber containing a movable bed of catalyst, such as an annular, movable bed of reforming catalyst onstream processing hydrocarbons, wherein the catalyst is to be withdrawn relatively free of hydrocarbons and in uniform amounts from the plurality of withdrawal points equally spaced across the catalyst cross-sectional area. Catalyst containing hydrocarbon is withdrawn from the reaction chamber, which is maintained under hydrocarbon conversion conditions, through the plurality of points equally spaced across the catalyst cross-sectional area through a plurality of conduit means in communication with the movable catalyst bed. As the hydrocarbon containing catalyst is flowing through the first conduit means, it is contacted with a countercurrently flowing, relatively hydrocarbon-free gas such as reformer recycle gas which is at a velocity sufficient to allow the catalyst to flow and to simultaneously strip the hydrocarbons contained in the flowing catalyst, thereby producing a relatively hydrocarbon-free catalyst. The resultant hydrocarbon-free catalyst is passed to the solids collector zone comprising a plurality of vertical collection zones of approximately equal fixed volume and equal to the number of conduit means. Each conduit is in communication with a given vertical collection zone and terminates at an equal distance within each collection zone. Further, the solids collection zone has a top cylindrical zone, a bottom inverted conical zone, and a withdrawal zone in communication with each collection zone in the lower portion of the conical zone. This orientation automatically terminates the flow of catalyst through each conduit means when the amount of catalyst in each collection zone reaches the termination point of the conduit means as it discharges to each collection zone. When the flow is thus automatically terminated, the velocity of the countercurrently flowing gas stream is increased to a velocity sufficient to maintain a terminated catalyst flow but below the velocity which is required to reverse the flow of catalyst, and the catalyst is then withdrawn from the collector zones while the flow of solids from the reactor chamber is terminated.

Other possible embodiments and a more detailed description of the foregoing embodiments will be found in the following more detailed description of this invention.

DETAILED DESCRIPTION OF THE INVENTION

The apparatus and method of the present invention is applicable where a movable bed of solids contained within a chamber is to have a portion of the solids removed from a plurality of points on the cross-sectional area of the solids bed wherein removal of equal amounts of solids is desired from each withdrawal point. Although not to be deemed limiting, the present improved apparatus and method will be described in relation to a system for the catalytic reforming of a naphtha charge stock since this improved apparatus and method is particularly suited for application therein. Generally speaking, catalytic reforming of a hydrocarbon naphtha is effected through the utilization of a platinum containing catalyst of a type well known to those schooled in the reforming art. Typical reforming catalysts are a platinum-alumina-halogen composite, preferably in a spherical form of about $\frac{1}{32}''$ to $\frac{1}{8}''$ in diameter. The utilization of a spherical form catalyst provides a system with free flow characteristics which will not readily plug or block a descending column or columns of catalyst. The conduits through which the catalyst is withdrawn from the reforming chamber are preferably of small diameter so that catalyst flow through the conduit will remain terminated when the countercurrently flowing gas stream is increased and when the catalyst is withdrawn from the collector zones. It is particularly important that the catalyst be of small enough diameter, such as less than $\frac{1}{8}$ of an inch, so as to enhance gravity flow from the reaction chamber through the conduits to the solids collector vessel.

As previously indicated, although the apparatus and method of the present invention find particular utility in a catalytic reforming operation, it is to be noted that the system described and claimed herein may well be utilized to carry out other hydrocarbon conversion operations such as desulfurization, hydrocracking, dehydrogenation, isomerization and the like as well as other chemical conversions not directly related to the processing of a hydrocarbon charge stock. In more detail, the catalyst to be employed when the present invention is utilized in a reforming embodiment comprises a platinum group metal, halogen and alumina. Such a composite, formed as a spherical catalyst, is illustrated in U.S. Pat. No. 2,620,314. A preferred catalyst is a spherical alumina composite comprising platinum and combined chlorine. Further, the catalyst may include an additional component such as rhenium which is well known to those trained in the art as enhancing the stability of a reforming catalyst. Generally, the platinum group metal such as platinum will comprise from about 0.01 to about 5 wt. percent of the catalytic composite, and the halogen component such as chlorine will comprise about 0.5 to about 1.5 wt. percent of the composite.

Catalytic reforming conditions are equally well known to those trained in the art and include a temperature in the range of 700° F. to about 1000° F., a pressure of about 50 p.s.i.g. to about 1000 p.s.i.g., a liquid hourly space velocity of from about 0.2 to about 10 hr.$^{-1}$ and a hydrogen to hydrocarbon mole ratio of about 1:1 to about 10:1 The apparatus and method of the present invention is particularly applicable in a low pressure reforming operation within the range of about 50 p.s.i.g. to about 200 p.s.i.g.

As indicated, the present invention provides an improvement in an apparatus and method for reforming of a hydrocarbon feedstock with a catalytic system characterized by a substantially constant catalyst activity level. This maintenance of a constant activity level is accomplished by a constant withdrawal of used catalyst and the replacement of the withdrawn catalyst with fresh or regenerated catalyst whereby the catalytic system remains at a constant activity level at a given temperature, pressure and space velocity. This is in contrast to conventional non-regenerative and regenerative operations wherein catalyst activity is maintained at a constant level by increasing the severity of the operation. Such a system wherein catalyst is either constantly or periodically being replaced by a regenerated catalyst is illustrated by U.S. Pat. No. 3,470,090. In addition to the process illustrated in this cited patent wherein each of the reforming reactors are maintained on relatively the same plane, a stacked reactor orientation is also applicable. In this multiple stacked reactor system, fresh or reconditioned catalyst is continually added to an initial or top reactor and processed sequentially through the reactor system with the catalyst being withdrawn from the final or bottom reactor for reconditioning by methods well known to those trained in the art. Thus, in effect, the stacked reactor system will have a common catalyst bed moving as a substantially unbroken column of particles from the top reactor to the bottom reactor.

The exact construction and operation of the system and method of the present invention will become more self-evident by reference to the attached drawings. These drawings are directed to a catalytic reforming embodiment wherein the catalyst is contained as an annular bed. This application is not to be deemed limiting, however, since the generally broad scope of the present invention applies to the removal of solids from any movable bed system.

DESCRIPTION OF THE DRAWINGS

Referring now to FIG. 1, a straight run naphtha fraction, boiling in a 200° F. to 400° F. range is charged through line 1 and is commingled with a hydrogen-rich recycle gas stream recovered by conventional means, not shown, entering via line 2. The resultant naphtha-hydrogen mixture is passed through line 3 and heater 4 to raise the mixture to reforming temperatures. The thus heated mixture is passed via line 5 to a stacked reforming system comprising upper reactor 9 and lower reactor 19.

Figure 1:
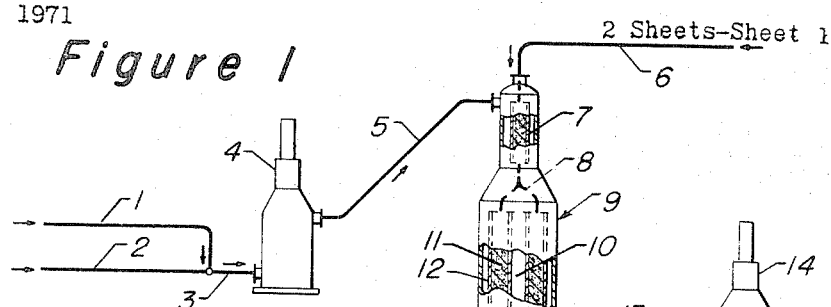
FIG. 1 is a diagram, schematical in form, illustrating the reforming of a naphtha fraction in a stacked bed reformer design employing the improved system of the present invention.

Reformer reactor 9 is in vertical alignment with reforming reactor 19 with an intermediate heater 14 provided therebetween to resupply the heat necessary for the endothermic reaction. Located above reactor 9 is a catalyst reduction section 7 wherein fresh or regenerated catalyst entering via line 6 is contacted with hydrogen and heat exchanged indirectly against the heated naphtha-hydrogen mixture entering via line 5.

The catalyst contained within reforming reactors 9 and 19 are spherical 1/16" diameter alumina particles containing about 0.375% platinum and about 0.9 wt. percent chlorine. Each reactor is maintained at a temperature in the range of 850° F. to about 950° F. and a pressure of about 200 p.s.i.g. As illustrated, reforming reactor 9 contains an annular movable bed 11 formed by spaced cylindrical screens 12. The naphtha-hydrogen mixture is contacted with the catalyst in an out-to-in radial flow fashion through the catalyst bed with the reactant stream continuing outwardly through a cylindrical space 10. The resultant conversion product is withdrawn through conduit 13 and passed to inter heater 14 where the reaction effluent from reforming reactor 9 is reheated and passed back to the reforming system via line 15 and contacted with reforming catalyst contained in lower reforming reactor 19.

Within reforming reactor 19, the reactant stream is again passed through the annular catalyst bed 17 in an out-to-in radial flow fashion in substantially the same manner as the reaction mixture was contacted in reactor 9. The reactants in reforming reactor 19 are passed into cylindrical space 18, withdrawn via line 20 and passed to conventional product separation facilities for recovery of a high octane gasoline product and recycled hydrogen.

Referring back to reforming reactor 9, catalyst particles entering via line 6 pass through reducing zone 7, and are equally distributed throughout the annular moving bed 11 by a plurality of conduit means 8. The catalyst particles in reactor 9 are either continuously or intermittently allowed to flow by gravity through reactor 9 and are removed from the bottom portion of reactor 9 by a plurality of conduit means 16, which withdraw the catalyst from reactor 9 at a plurality of points and introduces the catalyst to reactor 19, also at a plurality of points to help insure a uniform catalyst distribution throughout the entire system. Conduits 16 are of sufficiently small diameter such that a relatively small flow of naphtha-hydrogen mixture through the catalyst in each of these conduit lines creates sufficient pressure drop so that essentially all of the naphtha-hydrogen mixture produced in reformer reactor 9 and passed into central space 10 is removed via line 13 and passed to inter heater 14. When this orientation is utilized, very little, if any, of the flow from reactor 9 by-pass inter heater 14. In effect, the combined reforming reactor system comprising reforming reactor 9 and reforming reactor 19, has a common catalyst bed moving as a substantially unbroken column of particles through the top reactor 9 and bottom reactor 19. In a typical reforming operation, the catalyst is withdrawn from the lower reactor 19 via conduits 22 at a rate such that the catalyst inventory of the total reactor system is replaced in 30 day cycles or less.

The reforming catalyst is withdrawn from lower reactor 19 through a plurality of exit ports 21 and conduit means 22 equally spaced across the cross-sectional area of the annular catalyst bed. More specifically, when catalyst is being withdrawn from lower reactor 19, valve 27 in line 28 is in a closed position. Catalyst is withdrawn and passed to a solids collecting zone 23 which comprises a vessel divided into a plurality of vertical sections by a plurality of vertical baffles 25 with each section being of relatively equal volume and equal in number to the plurality of conduit means. Conduit means 22 connects withdrawal port 21 and each of the vertical sections within solids collector 23, and terminates a small distance within each of the collection sections. Located in the bottom conical portion of solids collector 23 is a non-baffled collection zone 26 in communication with each of the vertical sections.

While the catalyst is being withdrawn from reactor 19 via conduits 22, it is contacted in conduit 22 with a countercurrently flowing cool hydrogen stream which first enters collector vessel 23 via line 24. This gas stream which is actually a recycle hydrogen stream relatively free of hydrocarbon, enters the top portion of the collector vessel and flows up through conduit 22 at a velocity sufficient to allow a continuing flow of catalyst but in an amount sufficient to render the catalyst entering solids collector 23 substantially free of hydrocarbons and at a temperature below the temperature of reforming zone 19. More particularly, the solids entering solids collector 23 contain less than 2% by weight hydrocarbons. The catalyst is allowed to flow through lines 22 until level of catalyst in each vertical section in collector 23 reaches the discharge point of lines 22. At this point, catalyst flow is automatically terminated because of the flow characteristics and angle of repose of the catalyst. In other words, the catalyst will not overflow from one compartment into another and the volume withdrawn from each of the withdrawal points 21 is equal to the volume of each of the vertical sections in collector vessel 23. In actual operation, because of variances in flow rate through each of the transfer conduits 22, each of the vertical sections fill at differing rates. However, when the level of the catalyst in all of the vertical sections reaches the outlet of transfer conduits 22, the gas rate through line 24 is increased to velocity sufficient to keep the catalyst flow rate through lines 22 in a terminated state when the catalyst is subsequently withdrawn from collector vessel 23. In a typical operation, a countercurrent hydrogen mass flow rate through each of the catalyst transfer conduits 22 is maintained at about ¼ of the average mass flow rate of the catalyst being withdrawn. After sufficient time has been allowed for each of the sections in solids collection vessel 23 to be filled, the velocity in conduits 22 is increased to a velocity approximately two times the minimum fluidization velocity of the catalyst bed. This velocity is sufficient to maintain a completely terminated catalyst flow while catalyst collector 23 is emptied but is a velocity below that which would cause the catalyst to back up through the transfer lines 22.

As illustrated, catalyst is withdrawn from reactor 19 in an intermittent fashion. However, by providing a plurality of collection vessels 23, catalyst can be continuously withdrawn in a non-intermittent fashion from the reforming reactor system so as to provide a continuous flow of catalyst through the reactor system.

The catalyst withdrawn from solids vessel 23 is passed to lock hopper 29 via valve 27 and line 28 for separation of any residual hydrocarbons contained therein and to purge the catalyst of adsorbed hydrogen. After the catalyst is so purged, it is removed via line 30 through valve 31 and passed to lift engager 32 wherein the catalyst is entrained in a nitrogen stream entering by way of line 33 and is passed via line 34 to reconditioning or regeneration means not illustrated.

Figure 3:
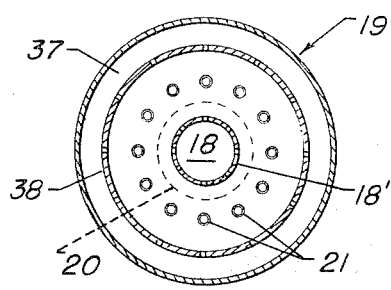
FIG. 3 is a sectional plan view through an intermediate portion of the reactor unit as indicated by line 3—3 in FIG. 1.

In FIG. 3, the exact orientation of withdrawal ports 21 in relationship to the annular bed is illustrated. Each of these withdrawal points is uniformly distributed across the catalyst cross-sectional area to insure a uniform transfer of catalyst from each point on the catalyst bed. The number of conduits will, of course, depend on the diameter of the reactor section used to effect the reforming reaction. Preferably, the catalyst bed section 17 is contained between cylindrical screens 38 and 18' and will be relatively narrow so as to minimize the pressure drop of the hydrocarbon passed radially through the catalyst bed to the interior portion of the reactor. Generally, a circular orientation of transfer conduits 22 will suffice for a uniform distribution of catalyst. Space 37 provides a flow path whereby the hydrocarbon may flow radially through the catalyst bed.

Figure 2:
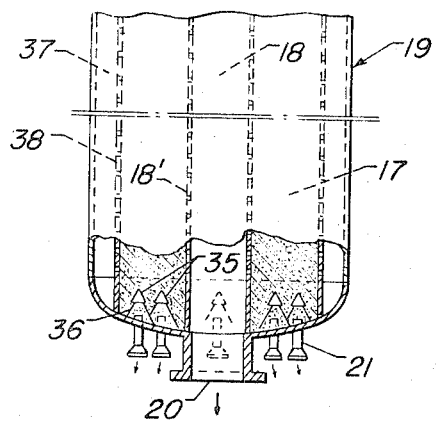
FIG. 2 is a detailed view of the bottom portion of the terminal reactor of the stacked reactor system.
Figure 2:
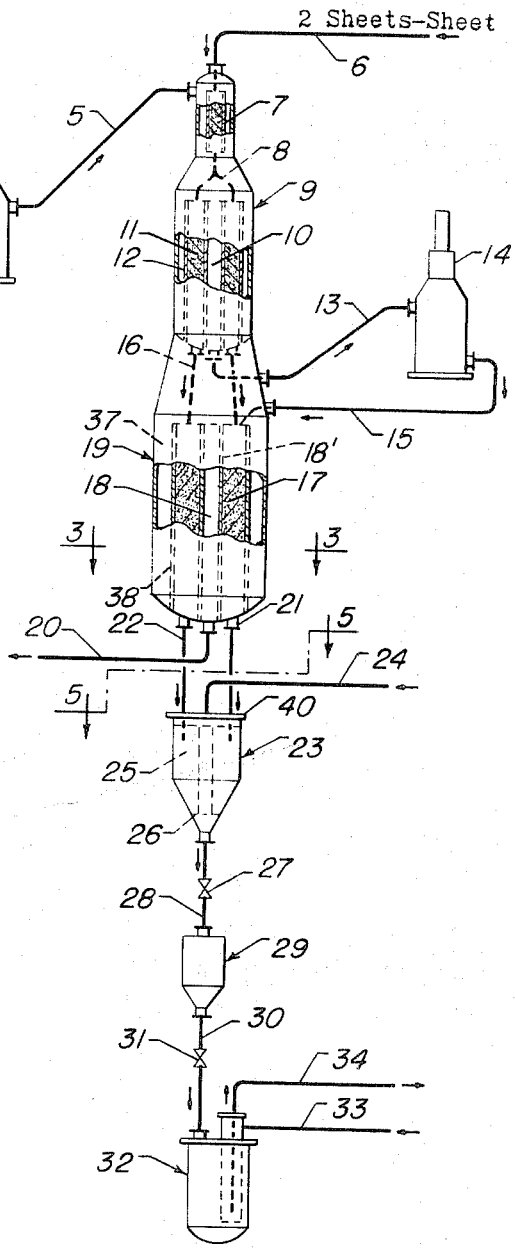
Figure 4:
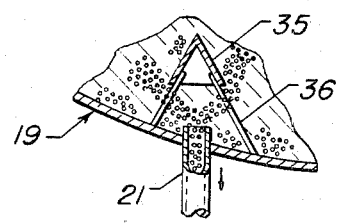
FIG. 4 is a partial sectional view of the upper portion of the catalyst transfer conduit and the conical deflector member attached over each opening in the reactor chamber.

In FIGS. 2 and 4, there is illustrated a preferred structure for effecting the withdrawal of catalyst from reactor 19. Over the inlet to each of the withdrawal points 21 will be a superposed cone member 35 supported by rods 36 which provide for a deflection of catalyst particles from a direct descent from the downward moving catalyst bed into the transfer conduits 22. In other words, catalyst particles will be caused to flow around the lower base operation of cone 35 and thence angularly or laterally into the top of each withdrawal point 21. This arrangement insures a generally downward, uniform movement of all the catalyst particles within the catalyst bed without leaving any large zones or pockets of slow moving or stagnant particles. With catalysts of $\frac{1}{16}''$ diameter, catalyst transfer conduits 22 may be 2 inches in diameter, 8 feet in length and spaced approximately 2 feet apart in a 7–12 foot diameter reactor vessel and will permit substantially uniform flow of all the catalyst from a superposed annular formed bed.

Figure 5:
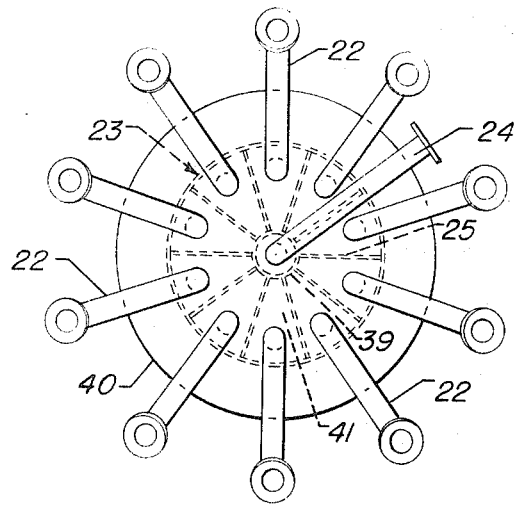
FIG. 5 is a plan view of the catalyst transfer conduits as they communicate with the lower catalyst collection zone as taken along sectional line 5—5.

Illustrated in greater detail in FIG. 5 is a plan view of solids collector 23 as taken along section lines 5—5 in FIG. 1. As can be seen therein, each of the withdrawal points 22 communicate with a vertical section 41 formed by a plurality of vertical baffle means 25. Communicating with the top portion of the solids collection vessel 23 and each of the transfer conduits 22 is the hydrogen transfer line 24 which provides the hydrogen necessary for stripping the catalyst of hydrocarbon and maintaining the catalyst in a terminated state of flow.

Figure 6:
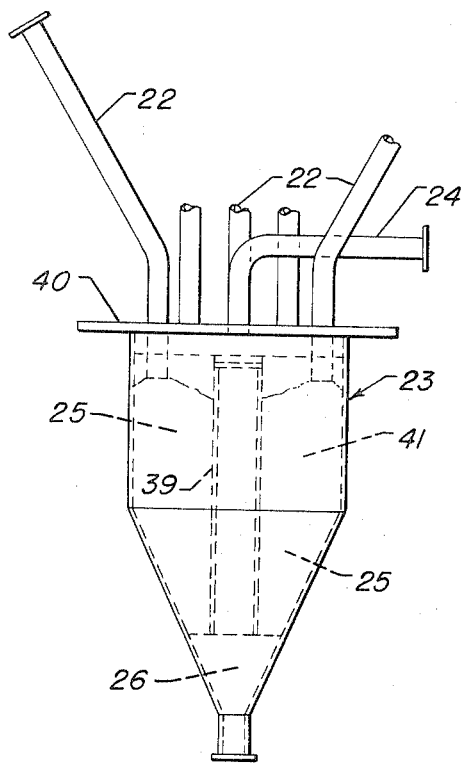
FIG. 6 is an elevational view of the catalyst collector, illustrating the preferred orientation of the interior baffles as they terminate in the bottom conical section of the vessel.

Referring to FIG. 6, there is shown an elevational view of the solids collector vessel 23. This embodiment of the solids collector, as illustrated in FIG. 6, has a solid plate 40 which seals the collector from the atmosphere. Baffles 25 are attached to a conduit 39 to form vertical sections 41. Conduit 39 is used simply to facilitate the fabrication and attachment of the baffles and is sealed at the top. Vertical baffles 25 terminate above the lowermost apex portion of the catalyst collector and form collection section 26. Section 26 and the openings communicating therewith from vertical sections 41 are sufficiently small in size such that when catalyst enters a given compartment, the propensity for catalyst to migrate into section 26 and upwards into the adjacent compartment is minimized. Conduit means 39 is open at the bottom so that any temperature and/or pressure cycling will impose no stress on the conduit, thereby avoiding the disruption or deformation of any of the vertical baffles 25. It is to be noted that vertical baffles 25 terminate a short distance below plate 40 such that hydrogen entering via line 24 may readily pass up through the plurality of conduits 22.

Figure 7:
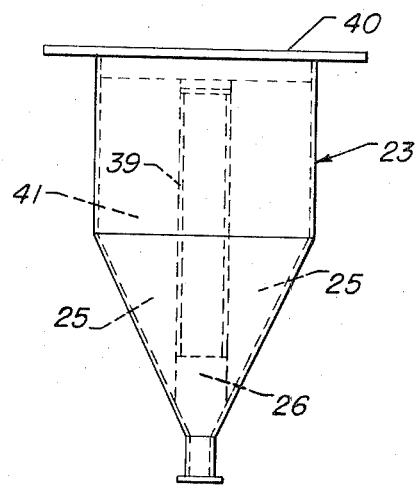
FIG. 7 is an elevational view of the catalyst collector illustrating an alternative arrangement of the baffles within the collection zone.

Illustrated in FIG. 7 is an alternate configuration for the lower collection zones 26. In this configuration, vertical baffles 25 extend downwardly, completely to the wall in the apex portion of the vessel. Vertical solids collector sections 41 are thus in communication with collection zone 26, as illustrated in FIG. 7, by a lateral inward movement of catalyst versus a downward movement as would be effected in FIG. 6.

We claim as our invention:

1. A method for withdrawing hydrocarbon reforming catalyst from a reaction chamber containing an annular movable bed of said catalyst while transversely processing a hydrocarbon feedstream therethrough, wherein the catalyst is to be withdrawn, relatively free of hydrocarbons, in substantially equal amounts from a plurality of withdrawal points uniformly spaced across the catalyst cross-sectional area which comprises the steps of:

(i) withdrawing catalyst containing hydrocarbons from the reaction chamber, while maintained at hydrocarbon conversion conditions, at a plurality of points uniformly spaced across the catalyst cross-sectional area, through a plurality of conduits in open communication with the movable annular catalyst bed;

(ii) contacting the hydrocarbon-containing catalyst in said conduits with a countercurrently flowing gas stream, at a velocity sufficient to allow the catalyst to flow through said conduits and to strip the majority of said hydrocarbons from the flowing catalyst, to produce a relatively hydrocarbon-free catalyst;

(iii) passing the hydrocarbon-free catalyst through said conduits to a solids collector vessel comprising a plurality of vertical collection zones of approximately equal, fixed volume and equal to the number of said conduits, each conduit being in open communication with a single collection zone and terminating an equal distance within each collection zone, said solids collector zone having a top cylindrical zone, a bottom, inverted conical zone and a withdrawal zone in communication with each collection zone in the lower portion of the conical zone, whereby the flow of catalyst through the conduits is automatically terminated when the level of catalyst in each collection zone reaches the discharge end of the conduits;

(iv) increasing the velocity of the countercurrently flowing gas stream to a level sufficient to maintain said terminated catalyst flow but below that level which would reverse the flow of catalyst in said conduits; and (v) withdrawing the catalyst from the collector vessel while the flow of solids from the chamber is terminated.

2. The method of claim 1 wherein the countercurrently flowing gas is hydrogen.

References Cited

UNITED STATES PATENTS

| | | | |
|---|---|---|---|
| 2,412,315 | 12/1946 | Evans | 208—171 |
| 2,756,193 | 7/1956 | Bergstrom | 23—288 G |
| 2,801,966 | 8/1957 | Mertes et al. | 208—173 |
| 2,772,216 | 11/1956 | Elliott | 208—173 |
| 2,724,683 | 11/1955 | Nadro | 208—173 |
| 2,897,138 | 7/1959 | Ardern | 208—171 |

HERBERT LEVINE, Primary Examiner

U.S. Cl. X.R.

208—150, 173; 23—288 G